United States Patent
Jones et al.

(10) Patent No.: US 7,943,031 B2
(45) Date of Patent: May 17, 2011

(54) DEWATERING TREATMENT SYSTEM AND METHOD

(75) Inventors: Colin John Francis Philip Jones, York (GB); John Lamont-Black, Newcastle Upon Tyne (GB); Stephanie Glendinning, Houghton-le-Spring (GB)

(73) Assignee: Electrokinetic Limited (GB)

( * ) Notice: Subject to any disclaimer, the term of this patent is extended or adjusted under 35 U.S.C. 154(b) by 1212 days.

(21) Appl. No.: 10/574,303

(22) PCT Filed: Oct. 1, 2004

(86) PCT No.: PCT/GB2004/004181
§ 371 (c)(1),
(2), (4) Date: Nov. 2, 2006

(87) PCT Pub. No.: WO2005/033024
PCT Pub. Date: Apr. 14, 2005

(65) Prior Publication Data
US 2007/0051682 A1    Mar. 8, 2007

(30) Foreign Application Priority Data
Oct. 1, 2003    (GB) .................................. 0323068.7

(51) Int. Cl.
*B01D 57/02*    (2006.01)
(52) U.S. Cl. ........................................ 204/650; 204/649
(58) Field of Classification Search .................. 204/648, 204/649, 650
See application file for complete search history.

(56) References Cited

U.S. PATENT DOCUMENTS

| | | | |
|---|---|---|---|
| 4,680,104 A | 7/1987 | Kunkle et al. | |
| 4,802,964 A | 2/1989 | Muralidhara et al. | |
| 5,192,413 A | 3/1993 | Yamaguchi et al. | |
| 5,403,455 A * | 4/1995 | Candor | 204/515 |
| 5,891,342 A | 4/1999 | Tije | |

(Continued)

FOREIGN PATENT DOCUMENTS
GB    2327686 A    2/1999
(Continued)

OTHER PUBLICATIONS
Search Report for PCT/2004/004181.

*Primary Examiner* — Arun S Phasge
(74) *Attorney, Agent, or Firm* — IPLM Group, P.A.

(57) ABSTRACT

An apparatus and method for reducing the liquid content of a particulate/liquid dispersion, such as a sewage sludge or mine tailings, are described. The apparatus comprises containment means to contain the material, and means to apply pressure to the contained material therein, the containment means being partly defined by a first filtration membrane permeable to the liquid but impermeable to at least some and more preferably substantially all of the solids contained within the material, in particular configured as a continuous belt press. The filtration membrane comprises a textile or other synthetic material in intimate association with a conducting element so as to constitute where so associated a first electrode. A second sheet material, preferably also a filtration membrane, is similarly associated with a conducting element so as to constitute a second electrode to allow application of a potential difference across the material and drive the dewatering process electrokinetically. Preferably, the apparatus is a belt filter press, and includes means to apply a variable and intermittent voltage to, and insulate from each other, two electrodes configured a continuously moving belts.

15 Claims, 4 Drawing Sheets

U.S. PATENT DOCUMENTS

| | | |
|---|---|---|
| 6,766,817 B2 | 7/2004 | da Silva |
| 6,918,404 B2 | 7/2005 | Dias da Silva |
| 7,066,586 B2 | 6/2006 | da Silva |
| 7,285,255 B2 | 10/2007 | Kadlee et al. |
| 2003/0150789 A1 | 8/2003 | Miller et al. |

FOREIGN PATENT DOCUMENTS

| | | |
|---|---|---|
| JP | 59-036507 | 2/1984 |
| JP | 62-254817 | 11/1987 |
| JP | 01-127012 | 5/1989 |
| WO | WO 91/01392 A1 | 2/1991 |
| WO | WO 95/21965 | 8/1995 |
| WO | WO 00/39405 A1 | 7/2000 |
| WO | WO 03/094599 A1 | 11/2003 |
| WO | WO 2004/007045 A1 | 1/2004 |
| WO | WO 2005/058463 A1 | 6/2005 |

* cited by examiner

DEWATERING TREATMENT SYSTEM AND METHOD

This application claims priority from Application No. GB 0323068.7, filed Oct. 1, 2003, and International Application No. PCT/GB2004/004181, filed Oct. 1, 2004, published as WO 2005/033024 A1 on Apr. 14, 2005, all of which are incorporated herein by reference.

The invention relates to a system and method for the treatment of sludges, slurries, pulps, mineral wastes, slimes, muds, dredgings, tailings and other materials comprising a mixture of solid particles and liquid to reduce the liquid content thereof, and in particular to a system and method for the dewatering of sewage sludge and mine tailings.

Industrial processes result in the generation of large quantities of sludges, slurries, pulps, tailings and other materials where there arises a requirement to reduce water content, for example to facilitate handling of such waste materials and/or to recover water content therefrom for reuse.

For example sewage treatment processes require treatment of sewage sludge. Typically these materials might have an initial solid content of 0.01 to 10%. It is apparent therefore that this material can be reduced significantly in volume if the solid content can be increased by dewatering.

In the case of mine tailings water content can be greater and volumes of waste materials are extremely large. Disposal is by storage in large tailings lagoons. Reduction in volume decreases the costs of mining and also permits the reclamation of water, which is important in arid regions.

Current methods used to dewater sludge and other materials include continuous processes such as belt filter presses and batch processes such as plate filter presses. These systems operate by providing a positive pressure to the waste material contained within filter sheets or plates of a static cell or between filter belts of a continuous belt filter press using mechanical or hydraulic means. By way of example, discussions below concentrates on sewage dewatering systems and tailings dewatering, but the invention is of general applicability to the removal of water and other liquids from a full range of materials comprising a mixture of solids and liquids to produce a dispersement or mixture of solid particles and liquid, whether the liquid is such that the mixture behaves predominantly as a solid or predominantly as a liquid.

The applied pressure induces hydraulic drainage in accordance with Darcy's law (i.e. the quantity of water/fluid removed is a function of the pressure applied, the hydraulic gradient, the surface area and the hydraulic conductivity of the material). Drainage is effected through a drainage medium which typically takes the form of a polymeric belt or sheet comprised as, or as a part of, one or more walls of the pressure cell in a static plate filter press or one or more of the belts in a belt filter press as the case may be. Drainage can be operated as a batch process, but belt filter press processes are often preferred as they can be made continuous, with the belt filter press configured as a sludge conduit whereby relatively low solids content sludge is input at one end in a fully watered state, passed along under progressively increasing pressure (conveniently by reducing the distance between the belts) and delivered at an output in a partly dewatered state at the other end. Pressure is usually applied by rollers. Belt arrangements may be linear or geometrically more complex.

The sludge may be chemically pre-treated to enhance the dewatering effect, for example by the addition of organic or inorganic flocculants, coagulants or the like.

The principal limitation of the current technology is that as the drainage proceeds the hydraulic conductivity of the waste material decreases and an ever-increasing external pressure needs to be applied to maintain drainage. This places a practical limitation on the extent to which the sludge, slurry, tailings or other material can be dewatered using a practical system relying on pressure alone. For example in practice the maximum degree of dewatering which can typically be achieved in conventional sewage sludge belt presses is such as to produce an output dewatered sludge with a percentage of dry solids varying between 15 and 20%. Whilst this is appreciably more concentrated than the initial fully-watered sludge the liquid content remains significant. It remains desirable to reduce this still further.

It is an object of the present invention to mitigate some or all of the above limitations of liquid removal systems.

It is a particular object of the present invention to provide an apparatus and method for the removal of liquid from a sludge, slurry, pulp, tailings or other material comprising a mixture of solid particles and liquid to reduce the liquid content thereof, which method is based on current, pressure-based apparatus and methods and in particular is retrofittable to existing, pressure-based apparatus, but offers enhanced efficiency of liquid removal.

It is a particular object of the present invention to provide an adaptation to existing pressure-based apparatus and methods for the dewatering of sewage sludge which enhances the dewatering process.

It is a further particular object of the present invention to provide a means to treat mine tailings to reduce the volume of the waste material to be disposed of and/or to remove water for reuse for example when mining is being conducted in arid regions.

Thus according to the invention in a first aspect there is provided an apparatus for reducing the liquid content of a material comprising a particulate/liquid dispersion, the apparatus comprising containment means to contain the material, and means to apply pressure to the contained material therein, the containment means being partly defined by at least one first sheet member comprising a first filtration membrane permeable to the liquid but impermeable to at least some and more preferably substantially all of the solids contained within the material, wherein the filtration membrane comprises a textile or other synthetic material having at least one conductive element in integral association with at least a part thereof so as to constitute where so associated a composite first electrode, and being further partly defined by at least one second sheet member comprising a textile or other synthetic material having at least one conductive element in integral association with at least a part thereof so as to constitute where so associated a composite second electrode, the first and second electrodes being remotely spaced from each other in contact with the material to allow application of a potential difference across the material.

In accordance with the invention the apparatus still applies pressure in the conventional manner to effect a degree of drainage in the manner above described. In particular, pressure is applied in that the means to apply pressure acts to urge the first and second sheet members into closer association with each other, reducing the distance between them, applying hydraulic pressure to the material to be dewatered which is retained between them, and driving a first, hydraulic, dewatering process. In this respect the filter membrane serves as a conventional drainage medium as above described.

However, the filtration membrane is, at least in one or more areas thereof, provided in integral contact with a conductive material so as to serve in use as a first electrode, acting in like manner to a conducting electrokinetic textile or other synthetic material. This, together with the presence of the second electrode in the form of the second sheet, allows a voltage to be applied across the material to be dewatered. The resultant electro-osmotic effect acts in concert with the drainage effect produced by the mechanically applied pressure to enhance the dewatering. The electro-osmotic dewatering effect may be produced simultaneously with and/or subsequent to conventional hydraulic/mechanical dewatering. For example, initial dewatering of the wettest materials may be hydraulic, with subsequent dewatering being electro-osmotic, or being produced by a combined electro-osmotic and hydraulic pressure effect.

A further benefit of the electrokinetic enhancement of the system is to change the nature of the wet material to permit easier transport typically by conveyor belt systems. In this case, which applies particularly to very wet suspensions such as mine tailings, removal of water from the tailings waste is effected to the point where it no longer behaves as a liquid. A feature of mine tailings is the large volumes produced. The invention in this respect is particularly suited to treatment of large volumes by the use of multiple belt filter press apparatus operating in parallel or series.

The ability of electrokinetic phenomena to move water, charged particles and free ions through fine-grained low permeability substrate is established. There are five principal electrokinetic phenomena: streaming potential, migration potential, electro-osmosis, ion migration and electrophoresis. The last three are concerned with the transport mechanisms developed upon application of an electrical field across a substrate mass and are relevant to the present invention, which exploits elecro-osmosis in particular.

To generate an electro-osmotic effect, an electrical field is applied across a substrate mass. Cations are attracted to the cathode and anions to the anode. The three transport mechanisms are explained below. In electro-osmosis, as the ions migrate they carry their hydration water with them and exert a frictional force on the water around them. Hence, there is a flow of water at both the anode and the cathode. In order to maintain a charge neutrality however, there are more cations than anions in the pore fluid of the substrate containing negatively charged particles. Therefore there is usually a net flow of water to the cathode. This electro-osmotic flow depends upon the applied voltage gradient and the electro-osmotic permeability of the substrate.

In accordance with the invention, the combination of conventional pressure drainage and electro-osmotically induced drainage enhances the liquid removal process. For a given apparatus and applied pressure, advantages can be obtained both relating to the speed at which liquid is removed and relating to the maximum degree of drying which can be practically obtained. The apparatus does not require great deviation from established principles. Rather, it exploits established principles for the removal of liquid from sludge and any other material using applied pressure through a filtration membrane, but enhances the effect by causing the filtration membrane, or at least parts thereof, to function during use as a conducting electrokinetic textile or other material. It has been found that using electro-osmosis can significantly enhance the treatment of the material using otherwise conventional technology.

As far as generating an electro-osmotic enhancement in accordance with the invention is concerned, liquid to be removed is only likely to be driven to one electrode, usually the cathode. Hence, a first electrode only has to be a filtration membrane. For example, water is driven to the cathode, and it is only strictly necessary for the cathode to be a filtration membrane. Nevertheless, it is preferable also that the sheet material comprising the second electrode, in use intended to be the anode, is similarly a second filtration membrane permeable to the liquid but impermeable to at least some and more preferably substantially all of the solids contained within the material. In this way, both the first and second filtration membranes are able to contribute to the hydraulic dewatering.

The filter membrane or other sheet material is described as a textile or synthetic, which in this context means a sheet-like material having a primarily polymeric base structure. The textile may be woven, knitted, needle-punched, non-woven or otherwise fabricated. Woven and knitted structures are especially preferred. The textile includes conducting elements within or on the sheet structure in intimate association, for example within, and in particular woven or knitted into a woven or knitted sheet. These conducting elements may be metallic, in a composite material composition, but the sheet is not fabricated entirely or primarily from metal alone. Particularly suitable materials will include those materials known for use as conducting geosynthetic materials.

In the preferred case therefore, an electrokinetic geosynthetic type material is used. This can provide all the functions of a conventional geosynthetic material (i.e. drainage, filtration and reinforcement) as well as acting as an electrode.

The key to the invention is that the textile or like synthetic material making up the filtration membrane is able in use to function, at least over a part of the area thereof, as an electrokinetic textile/synthetic material during the electro-osmotic dewatering phase of operation, and as a conventional filtration material during a prior hydraulic dewatering phase of operation.

To effect this the filtration membrane or other sheet electrode is inherently a conducting material, or is at least partly comprised of conducting material, in that the material of the filtration membrane or other sheet electrode is inherently conducting or integrally incorporates conductive material into or onto a surface of its structure. For example, the material of the filtration membrane is a geosynthetic material.

The entire filtration membrane may integrally comprise conducting electrokinetic textile/synthetic material. Conveniently however, the filtration membrane preferably comprises a plurality of discrete electrically isolatable conductive regions. This allows applied current in use to be limited to discrete areas, or varied between areas, as required.

The present invention is suited to any pressure-based sludge, tailings or other material dewatering treatment system, whether batch-operating, or continuous. However its particular advantages are conferred in relation to continuous processes, such as belt filter presses. Accordingly, in a preferred embodiment of the invention, the apparatus is a belt filter press wherein at least one of the belts (being the cathode in use) is a first filtration membrane as above described associated with a conductor so as to function as a first electrode for at least a part of the length thereof in the manner above discussed, and preferably each belt is a filtration membrane as above described associated with a conductor so as to function as an electrode for at least a part of the length thereof in the manner above discussed. Preferably each belt is at least partly comprised of conducting electrokinetic textile/synthetic for example geosynthetic (EKG) as above described.

That is to say, the apparatus as above described is configured such that the containment means defines a conduit with an input for material to be dewatered such as sludge/tailings, an output for material to be dewatered such as sludge/tailings, means to apply pressure therealong, especially steadily increasing with distance from the input to the output, a first belt member comprising a filtration membrane substantially along the length thereof, the filtration membrane being associated with a conductor for at least a part of the length thereof to form a first electrode, and a second belt member spaced apart from the first belt member to retain material to be dewatered therebetween, the belt member being associated with a conductor for at least a part of the length thereof to form a second electrode such as to allow an application of potential difference across a material to be dewatered within the conduit.

A potential difference is applied along such part of the length of the conduit as it is desired for an electrokinetic as well as a hydraulic dewatering pressure to be applied. This may be essentially along the length of the conduit to ensure that essentially along its entire length an electrokinetic as well as a hydraulic dewatering pressure is being applied. In many practical applications it will be preferred to apply the potential difference only to a part of the conduit, in particular towards the downstream portion, such that initial dewatering is essentially hydraulic and dewatering is electrokinetically enhanced further downstream. Preferably, the second belt member is also a filtration membrane.

A single belt press machine may include more than one first and/or second belts, for example alternating anodes and cathodes in use. In a convenient embodiment of this, a belt press may be provided having a centrally located anodic belt and paired outer (for example upper and lower) cathodic belts, with material to be dewatered therebetween. Two electroosmotic circuits, urging water to each of the cathodes, are thus set up in use.

The means to apply pressure may act to urge the belts towards each other to induce a hydraulic pressure in the material to be dewatered therebetween. In a continuous belt process, it will usually be convenient for this pressure to increase as the material passes through the system. For example, the gap between the belts may be reduced.

Most conveniently, each belt is disposed as a continuous belt around a plurality of pressure rollers and/or guide rollers or other supports. Such a continuous belt conveniently also serves as a conveyor for the material to be dewatered, for example conveying material from an input zone through a dewatering zone to an output zone. As discussed below, the rollers/supports are insulators at least on a contact surface thereof.

Where it is desired to apply a potential difference across the material to be dewatered in a region relating to only a part of the filtration membrane, this may be achieved in that a conductor is associated only with that part of the filtration membrane. Alternatively, conductors may be associated with the membrane across substantially its entire area, for example in a plurality of discrete regions, but only electrically supplied in the desired region. Where the apparatus is a continuous belt apparatus, and more particularly where the belt comprises electrokinetic geosynthetic (EKG) material, the latter approach may be preferred.

It will be understood that none of the foregoing requires the area associated with the conductor in either the first filtration membrane or the second filtration membrane or other sheet to be continuous in the region where a potential difference is to be applied. Either or both may instead be disposed as a discontinuous plural array provided that the arrangement permits the application of the necessary potential difference across the sludge or other material to be dewatered in the area of the filtration membrane(s) to generate the necessary electrokinetic effect.

As indicated, the filtration membranes are integrally conducting and in particular comprise a conducting EKG material. The principles of conducting electrokinetic geosynthetic materials have been established, and were for example set out in International Patent application number WO95/21965 to Jones et al incorporated herein by reference.

The EKG material may have any suitable composition to give conductive properties. For example, the conductive geosynthetic material may comprise a generally inherently non-conductive geosynthetic material in association with at least one conducting element to produce a composite conducting geosynthetic material. Alternatively, the geosynthetic material may be inherently conducting, for example being loaded with conducting particles, and for example comprising polymeric material loaded with carbon. Such inherently conducting geosynthetic material may additionally be associated with at least one separate conducting element, to provide a composite conducting geosynthetic.

A possible electrically conducting geosynthetic material could simply comprise a conventional geosynthetic material which has woven therein, or threaded therethrough, electrically conducting filaments or threads which may be single or multi-stranded. The filaments or threads comprise conducting elements. In the instance where the electrically conducting geosynthetic is woven, electrically conducting threads or filaments may be intertwined with or enmeshed within conventional geosynthetic materials and in the instance where the electrically conducting geosynthetic is provided in a threaded form any preselected number of passages of thread through the material may be made according to a user's requirement.

The electrokinetic geosynthetic thus combines a role as an electrode driving the electro-osmotic enhancement of the drainage process with a means of providing hydraulic pressure and acting as a drainage/filter medium in a conventional filtration membrane role. It will be apparent that many of these advantages will also be relevant to the second electrode. According in a preferred embodiment, the second electrode is also a conducting geosynthetic material.

In a preferred embodiment, the electrokinetic belt or sheet medium comprises a woven or non-woven polymeric, and for example geosynthetic, material incorporating within the sheet or on a surface thereof a plurality of elongate conducting elements, in particular in one or more parallel arrays. Two or more arrays may be disposed in different directions to form a network structure. The elongate conducting elements conveniently comprise thread, tape, wire or the like. Preferably, the conducting elements are integrally within the sheet structure. The conducting elements may for example be threaded through or woven or knitted into the basic textile/geosynthetic material. For example the sheet is a woven structure, and the elongate conducting elements comprise warp and/or weft elements of the woven sheet structure.

The filtration membrane or other sheet electrode comprises sheet material, and the elongate conducting elements will be disposed generally laterally therewithin and/or on a surface thereof. Where the geosynthetic material constitutes a belt or part thereof for a belt press type device such arrays may lie generally parallel to, perpendicular to, or angled to the longitudinal direction of the belt.

Preferably, the belt is a woven material with longitudinal and transverse directions corresponding generally to warp and weft directions, and the elongate conducting elements comprise warp and/or weft elements within the woven belt. In particular, the conducting elements comprise an array of weft elements disposed generally transversely to the belt, and additional transfer elements are located generally toward one of both edges of the belt and extending longitudinally therealong, incorporated into the warp so as to be in electrical contact with the weft elements, but woven in such manner as to be partly exposed on the surface of the belt.

This arrangement provides a convenient electrical supply system. Projecting brushes, for example carbon brushes, are linked to a suitable power supply system, and caused to contact the belt in the region of the transfer elements. Discontinuities at longitudinal intervals may serve to electrically isolate belt segments, for example to apply current differentially between such sections.

The conducting elements may be metallic material. The environment generated by many of materials to be dewatered can be particularly harshly corrosive, and in order to get a satisfactory sheet life, the metallic conducting elements must be carefully selected for the environment. During electro-osmotic dewatering, the environment at an electrode functioning as an anode is likely to be much harsher. Accordingly, metallic material selected for the conducting elements constituting an electrode sheet intended in use to serve as an anode needs to be especially chemically resistant, and for example might be more chemically resistant than the metallic material selected for the conducting elements constituting an electrode sheet intended in use to serve as a cathode.

In a particular embodiment, for dewatering of materials that can be particularly harshly corrosive, at least the anode comprises conducting elements fabricated from metal coated in mixed metal oxide, for example in sheet, tape, wire or thread form. The technology of coating with mixed metal oxides is established, and the skilled person will readily understand the materials encompassed by this term. In particular, the coating should comprise materials selected from the oxides of tantalum, niobium, iridium, palladium, ruthenium, rhodium and mixtures thereof. The metal core may be formed of any suitable metal having regard to the intended application. For example in harshly corrosive environments, and/or to allow for imperfections and/or damage to the coating the metallic material forming the core is preferably a material capable of forming an effective passivating oxide layer, such as for example titanium, niobium, zirconium and alloys thereof. If environmental and/or service life considerations allow, a core formed of a metal exhibiting a lesser but still reasonable degree of stability in the corrosive environment such as stainless steel or copper might be acceptable.

In the less harsh cathodic environment, conducting elements fabricated from less resistant elements such as stainless steel elements might be used.

The electrodes provided in accordance with the invention do not corrode readily. Previous attempts at introducing electrokinetic processes to belt press and other sewage, mine tailings and like dewatering technologies have frequently failed due to the rapid deterioration of the electrodes. By contrast, there is a body of established EKG and like technology which will provide materials able to resist environmental degradation. The refinement of technological principles from this area to provide electrodes in the form of textile sheets incorporating conductive elements comprising metal coated with MMO is particularly corrosion resistant.

The invention offers particular advantages in relation to belt filter presses. In a normal belt filter press the belts move closer together as drainage occurs. This narrowing of the distance between the belts (electrodes) increases the potential gradient in the process without the need to increase the voltage applied. As a result, as the material dries out the electrokinetic force applied increases automatically. This is in direct contrast to conventional hydraulic dewatering. Nevertheless, if the belts are configured such that each electrode comprises a plurality of electrically isolated regions along the length thereof, voltage applied across the material to be dewatered between the belts can still be varied along belt length, for example to enhance this gradient effect yet further.

The applied voltage may thus be constant or variable, may be applied constantly or intermittently, and may where applicable be applied differentially to electrically isolated regions of the belts. Means are provided to apply a variable and intermittent voltage to the belts, in particular differentially to electrically isolated regions of the belts.

In normal hydraulic dewatering processes as the % dry solids increases the hydraulic permeability decreases and dewatering becomes more difficult. In conventional hydraulic dewatering the maximum pressure applied is when the belts pass over the rollers. Away from the rollers the pressure relaxes, as the belts are able to move apart a small amount. Because of the nature of particulate materials only a small movement is required to effect a major reduction in the effective hydraulic pressure. In the case of electro-osmotically applied pressure the small increase in the distance between the belts has a negligible effect on the electrokinetic force.

The normal distance apart of the belts in a belt press is typically 50 mm reducing to 20 mm, 10 mm or less as the process proceeds. Potential voltage gradients in the range 600 to 2000 or 3000 V/m or higher can be generated across the belts by applying a direct voltage of 30 Volts. As the voltage is low the process is inherently safe.

An unexpected feature of using an EKG-like material to form a belt press is that a major reduction in pathogens may occur in the sludge being treated. Studies on sewage sludge cake have shown a 6-log reduction in pathogens. The reduction in pathogens can be caused by a number of factors including: (a) chemical degradation of the pathogen cell walls in adverse pH conditions (especially high pH around the cathode); (b) surface charges on the cell walls of bacteria (e.g. *E. coli.*) give the particles a high mobility under an electrical field; (c) an increase in temperature of the sludge. The result is that pathogens are rapidly transported to the cathode where they are either destroyed by adverse pH or removed with the electro-osmotic flow with an additional pasteurization effect due to the increase in temperature.

Other benefits of the use of electrode sheet materials in accordance with the invention to form the belts in a belt filter press or the sheets of a static include evolution of ammonia which helps to improve C:N ratios and increased biodegradability of the dewatered material. In addition increased dewatering of activated sludge or the like is promoted.

Another benefit is that only parts of the belt need to be made conductive. It can be advantageous for the edges of the opposing belts not to be conductive as this permits the opposing belts to touch without creating a short circuit. This can be achieved either in that conductive elements are simply absent at the edges, or in that an insulating surface coating is applied.

Another benefit of using such materials to form the belt is that the detachment of the dewatered sludge is easier than if a metal belt is used. In addition the filter and drainage characteristics of a geosynthetic can be used and the belt can offer an element of elasticity.

Belts can be made of hydrophobic or hydrophilic materials this can have advantages in respect of dewatering or keeping the belts wet and therefore conductive.

Metal belts have been suggested for use in belt filter press dewatering systems but these can have inherent weaknesses if used with electrokinetic processes including corrosion and the release of metallic ions some of which may be toxic.

The means to apply pressure to the contained material to effect hydraulic dewatering will often conveniently comprise means to urge the first filtration membrane and second sheet (for example second filtration membrane) more closely together to generate hydraulic pressure in the contained material. Since the sheet members comprise electrodes, at least in part, it will be necessary that such urging means are insulators, at least on any contact surfaces. For example, where the dewatering apparatus is a belt filter press as above described, belts are typically disposed as continuous belts around a plurality of pressure rollers. These pressure rollers must be insulators, at least on any belt contact surfaces, for example having insulating, eg rubber, roller surfaces.

Sheets or belts as hereinbefore described can be used to retrofit existing dewatering plant to permit electrokinetic dewatering to be used as an alternative or, more usually, as a supplement to hydraulic dewatering.

Candidates for treatment include a variety of materials containing solid suspension in a liquid, including sewage sludges, mine tailings, organic slurries and the like. All sewage materials studied to date have been shown to support electro-osmotic treatment. In addition diamond, gold, platinum, coal and other mineral tailings are candidates for treatment.

Although much of the discussion herein has related to belt filter presses, the EKG-like materials and other electrode sheet materials described hereinabove as suitable for the belt filters of such systems can also be used in batch process dewatering systems, the EKG or other sheet taking the place of the textile filter/drains and also serving as an electrode. The benefits identified above apply equally to batch processing methods used to dewater sewage sludge and the like.

In accordance with the invention in a further aspect there is provided a method of removal of liquid from a material comprising a mixture of solid particles and liquid to reduce the liquid content thereof, for example from sludge, slurry or tailings, the method comprising the steps of:
containing the material within a containment means, which containment means is at least partially defined by at least one first sheet member comprising a first filtration membrane permeable to the liquid in the material but impermeable to at least some, and preferably substantially all, of the solid components of the material, which filtration membrane comprises a filtration material having at least one conductive element in integral association with at least a part thereof to serve as a composite first electrode; and is further partly defined by at least one second sheet member comprising a textile or other synthetic material having at least one conductive element in integral association with at least a part thereof so as to constitute where so associated a composite second electrode;
applying pressure to the material to induce hydraulic drainage through the filtration membrane;
simultaneously or otherwise, for example subsequently, applying a potential difference between the electrodes to induce electro-osmotic drainage through the filtration membrane.

Enhanced drainage effect is achieved by applying the pressure and the potential difference in such a manner that the hydraulic and electro-osmotic drainage effects complement and enhance each other.

Preferably, pressure is applied by urging the first and second sheet members into closer association with each other, reducing the distance between them, applying hydraulic pressure to the material to be dewatered as it is at retained between them, and driving a first, hydraulic dewatering phase.

Preferably the potential difference is applied across a controlled area of the sludge slurry, tailings or other material to be dewatered only, and/or applied intermittently and/or differentially to several controlled areas, which can be effected either by ensuring that only a controlled area is conductive or by applying a power source to only a part of the conductive area or to one or a few of a plurality of discrete conductive zones on the filtration membrane.

Preferably the sheet material comprising the second electrode is similarly a second filtration membrane permeable to the liquid but impermeable to at least some and more preferably substantially all of the solids contained within the material. In this way, both the first and second filtration membranes are able to contribute to the hydraulic dewatering.

As will be appreciated for the reasons given in more detail above, the process is in particular a continuous belt filter process, wherein the containment means is provided as a conduit with an input for material having full liquid content and an output for material where the liquid content has been reduced and a means to apply pressure therealong, especially pressure increasing with distance travelled along the belt in a dewatering direction, for example by reducing cross sectional area to an appropriate extent; and the method involves feeding material to be dewatered such as sludge slurry or tailings into the input, causing the material to travel there along, applying pressure and potential difference thereacross as above described to reduce the liquid content by simultaneous and/or sequential application of hydraulic and electro-osmotic drainage effects, and removing the material with reduced water content at the output.

In particular the method is a method for the treatment of sludges, slurries, mineral wastes, slimes, muds, dredgings or tailings, for example sewage sludge and mine tailings, by dewatering.

The invention requires little modification to the underlying construction of dewatering cells and belt filter presses. Existing designs can readily be employed, with a conductive filter membrane fitted or an existing filter membrane caused to become conductive in situ by associating in situ with a conductor element. In a further aspect the invention comprises a method of modifying a conventional hydraulic pressure dewatering apparatus such as a belt filter press by incorporating a conductive filter membrane as an in situ, retrofitted modification, so that the apparatus performs as the invention hereinbefore described, and further comprises a dewatering apparatus such as a belt filter press which has been so modified.

The invention will now be described by way of example only with reference to FIGS. 1 to 5 in which.

Figure 1A:
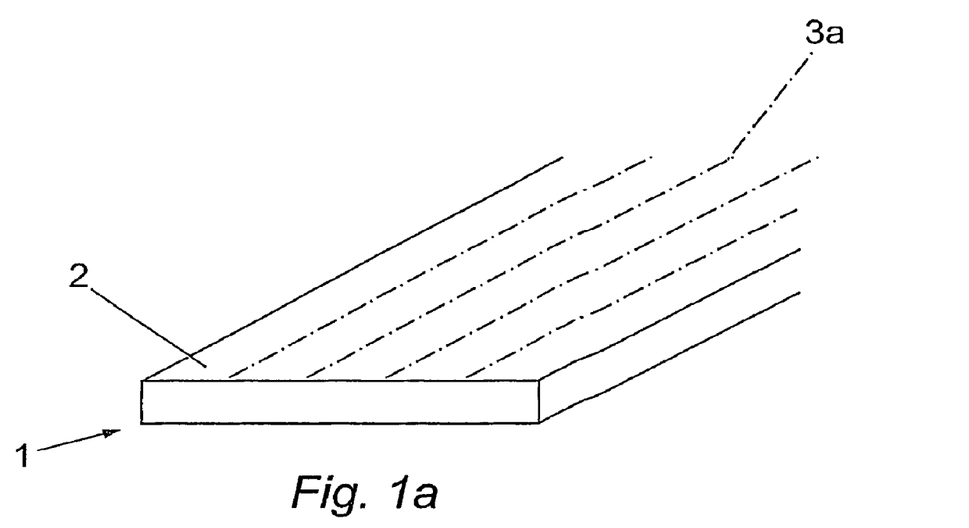
FIGS. 1 to 3 are representations of suitable materials for a filtration membrane in accordance with the invention.
Figure 1B:
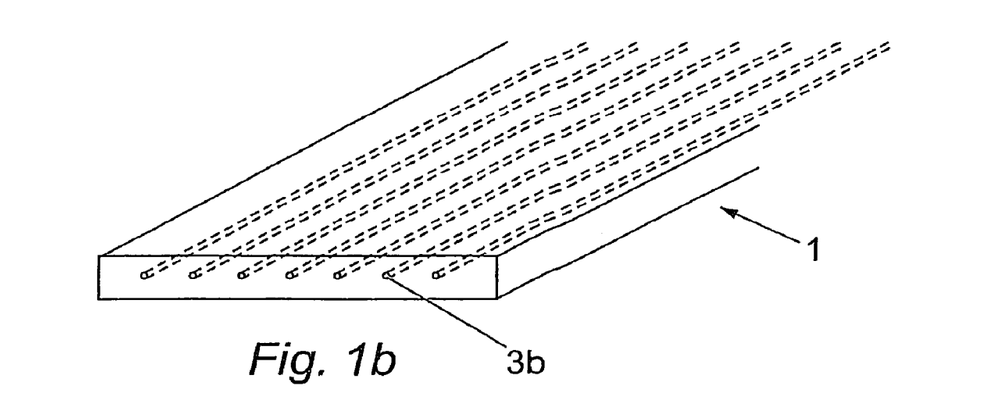
Figure 2A:
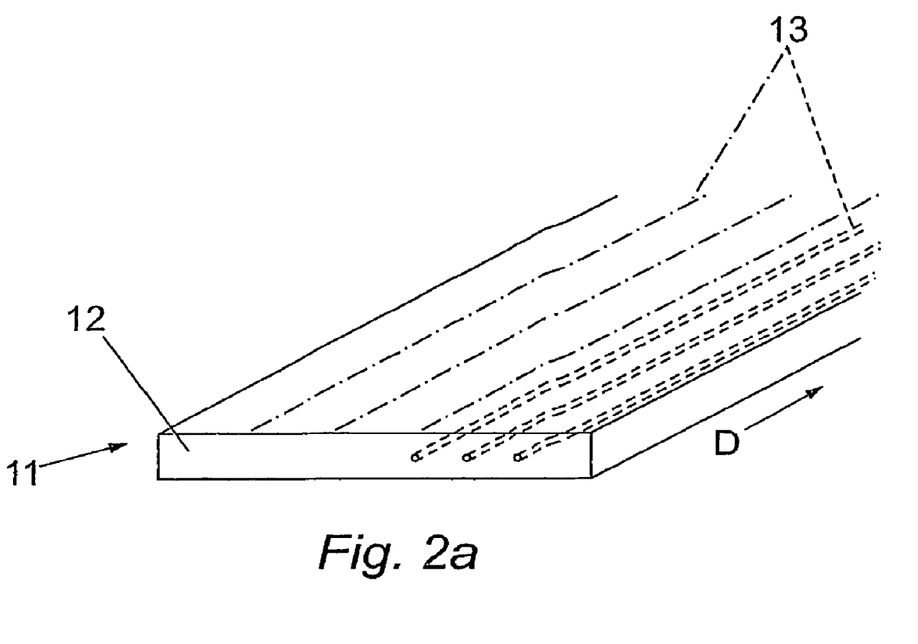
Figure 2B:
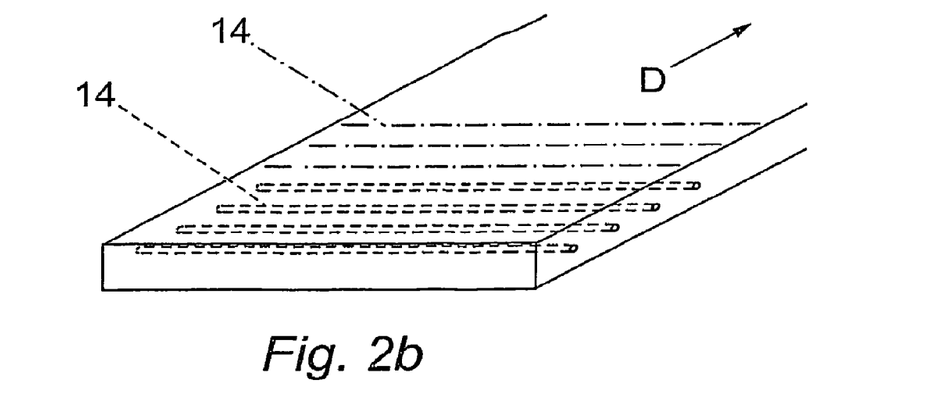
Figure 2C:
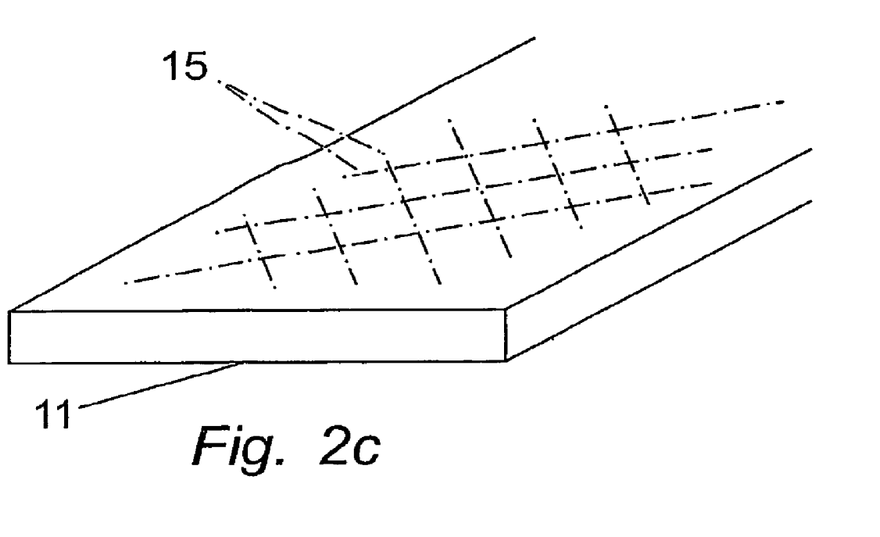
Figure 3A:
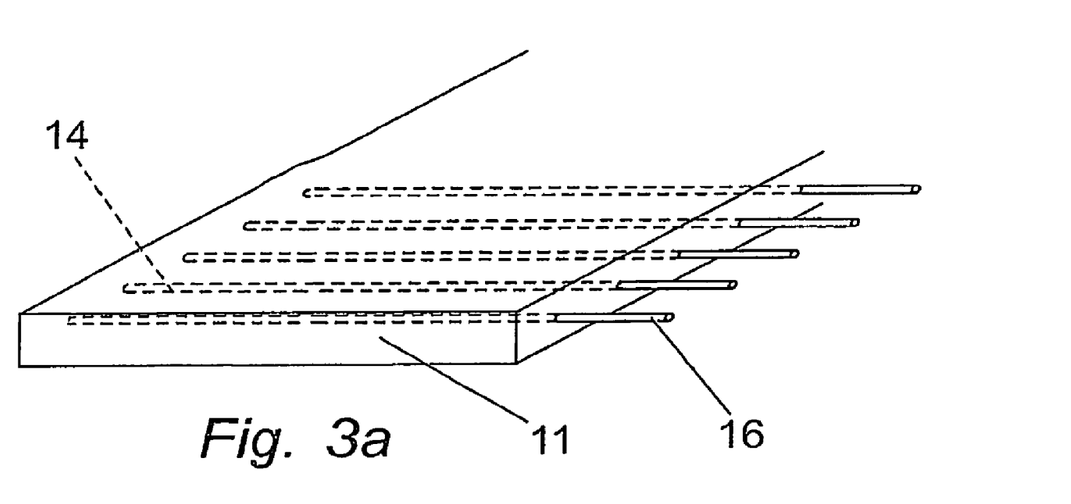
Figure 3B:
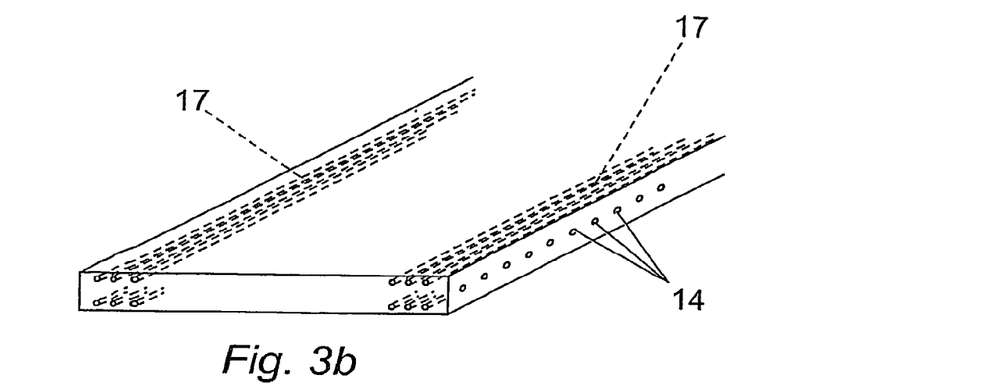

FIGS. 1 to 3 illustrate sheet materials suitable for use in accordance with the invention, for example as a belt in a belt filter press or as a filtration sheet for a cell for a batch system. In each case a woven sheet or belt 1 is formed from a base of woven polymeric material 2, to that extent comprising for example a conventional geotextile or geotextile-like material providing a drainage and filtration function. Suitable materials will include polyester, polypropylene and polyamides.

A parallel array of elongate conductors is provided in association with the sheet or belt 1. Suitable materials will include carbon, coated metals, in particular metals coated in mixed metal oxides, and conductive polymers.

Two alternative arrangements are shown. In FIG. 1a a first array of elongate conductors 3a is disposed on an upper surface 2 of the sheet or belt 1 in intimate contact therewith and a second array of elongate conductors (not shown) is disposed on a lower surface. In FIG. 1b a single array of elongate conductors 3 is disposed within the sheet or belt 1.

The drainage and filtration material is conveniently a belt for a belt press. The belt press is formed with conducting belt elements being provided with conductors in or on the surface of the belt in the manner, for example, of FIG. 1. FIG. 2 illustrates example conductor geometries with reference to application in an elongate belt, but such geometries could readily be applied to other filtration arrangements.

In FIG. 2a a woven or knitted textile belt 11 is formed from a base of polymeric material 12 into which is incorporated, preferably woven or knitted into the structure, a parallel array of elongate conductors 13, lying parallel to the intended direction of travel of the belt in use (as represented by the arrow D). In FIG. 2b a parallel array of elongate conductors 14 is woven or knitted into the belt 11 to lie generally perpendicular to the intended direction of travel of the belt in use. In FIG. 2c the elongate conductors 15 form a two-dimension network by being angled relative to the intended direction of travel of the belt in use.

It can be an advantage in some applications for only a section of the belt to be conductive at any one time. In a typical sludge dewatering system, at the beginning of the belt filter press dewatering process the belts are around 50 mm apart and the main dewatering process is hydraulic flow with limited need or potential for electro-osmotic enhancement. As the level of water in the treated material decreases the hydraulic permeability decreases, the rate of dewatering decreases and it can be efficient to apply the electro-osmotic pressure at this later point in the dewatering cycle. Using this approach can be more effective as the opposing belts are then at a reduced distance apart and the voltage gradient is optimised. In this case, the belt is so arranged, and in particular the conducting elements so disposed, that a plurality of discrete, electrically isolated areas lie longitudinally along the belt.

Disposing an array of conducting elements in the perpendicular direction of FIG. 2b is one way that this can be achieved. Two alternative example arrangements to effect such conduction zoning based on a FIG. 2b array are shown.

In the first, a belt is formed wherein each conducting element projects beyond a belt edge to provide a connection means for application of electrical power. This is illustrated in FIG. 3a. Conductive elements 14, for example tape or wire conductors, are incorporated into the belt 11 which is woven from polymeric material for a drainage function. The conductive elements 14 lie generally perpendicular to the direction of travel of the belt 11, which is conveniently the weft direction, the conductive elements 14 being incorporated as weft elements.

The successive projections 16 of the conductive elements 14 beyond the belt provide one example of a way to apply potential difference across one or more selected zones along the length of the belt. The principle of providing laterally projecting connectors projecting beyond a belt edge but conductively linked to conducting elements therewithin can be generally applied to create conduction zones provided that those conduction zones are electrically isolatable as discrete conducting regions along the length of the belt. The use of transverse conducting elements as illustrated in FIG. 3a is an example of a way this can be effected.

An alternative way of achieving an equivalent effect is shown in FIG. 3b. Again, a belt 11 has an array of weft conducting elements disposed generally transversely to the belt. Additional paired warp transfer elements 17 extend longitudinally along the belt towards the edge (but not at the edge, which is conveniently insulated to prevent shorting). The warp transfer elements are incorporated into the warp so as to be in electrical contact with the weft elements 14, but to weave through the structure so as also to be repeatedly exposed at the surface.

A convenient surface contact mechanism is achieved. Projecting brushes, for example carbon brushes, are linked to a suitable power supply system, and caused to contact the belt in the region of the transfer elements 17. Soft carbon brushes are preferred, which will not wear out the belt but will rather, over time, lay down a carbon conductive layer that will serve to improve electrical contact.

Sections of belt may be isolated by providing breaks along the length of the warp transfer elements to create conduction zones which are electrically isolatable as discrete conducting regions along the length of the belt.

Figure 4:
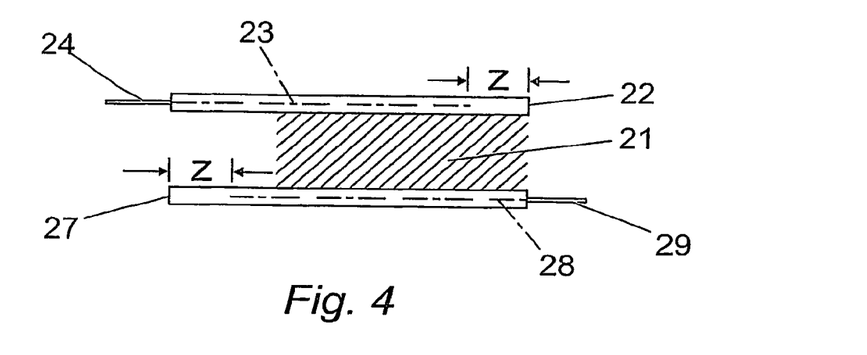
FIG. 4 is a cross-section of a possible belt filter press arrangement employing both conventional hydraulic drainage principles and the electrokinetic principles of the present invention.

FIG. 4 shows a further advantage of the system of the invention, illustrated as a cross-section through a sludge zone in a simple two-belt press. Sludge 21 is retained between a top belt 22 and a bottom belt 27. The conductor 23 of the upper belt projects beyond the edge, the projection 24 providing a contact for an external electrical power source. The conductor 28 of the lower belt projects beyond the opposite edge, the projection 29 again providing a contact for an external electrical power source. Each conductive element may also be curtailed on the opposite edge of the belt to the one where it projects, as is shown in the example. In this way, a non-conductive zone Z can be created at the edges of the belts, which can come into contact, avoiding shorting.

An alternative method to avoid shorting at the edges of the belts is to provide coatings of insulating material on the edges of the belts, along the entire length where shorting contact might occur. Similar insulation may be provided at the clipper seam. For example, a flexible layer of epoxy or like insulator is coated onto a fabricated belt.

An existing belt can be transformed easily into an electrode belt in accordance with the invention such as an EKG belt by causing a conductive element to be in intimate contact with a belt so as to act like the structure in FIG. 1a. Alternatively, more preferably, a specially fabricated belt incorporating a conductive element can readily be retrofitted to a standard belt press. Thus, a modified belt press in accordance with the invention can be created without departing from existing principles. Similar considerations will apply to pressure cells and the like.

A particularly preferred specification for a belt (also applicable to any other filtration/electrode sheet, for example in a static plate filter press) is set out in detail below.

There are four elements to the specifications contained herein:

1. Belt weave design
2. Insulation of the electrical components of the belts
3. Choice of materials for the conducting elements of the anode and cathode belts.
4. Electrical transfer method.

Weave and WTS (Warp Transfer Strip) Design

Based on a weave of 0.65/0.80 and 15/6

Total belt width=2200 mm

Width of WTS=60 mm

Width of opposing WTS=20 mm

WTS formed with metallic wires only i.e. 90 warp wires in WTS     Opposing WTS formed with alternating metal and polyester wires i.e. 15 metal wires in a width of 20 mm Weft wires spaced at 5 mm Belt Insulation The aim of belt insulation is to ensure that all the current between the anode belt and the cathode belt passes through the sludge rather than shorting owing to direct contact of the belts.

In reality is it unlikely that it will always be possible to prevent occasional contact of the belts. This is most likely to occur at the edges, therefore we suggested some form of insulation along the edges—similar to what might currently be used around the clipper seam (the seam joining the two ends of the belt to form a continuous belt). The precise scheme is not critical to the invention.

The materials used for insulating the belt should have a high electrical resistivity i.e. function as an insulator. Voltages of 0-40V are proposed. Most insulators are designed for much higher operating voltages than this, so leakage of current through the insulator should not be a problem.

Assuming that the insulator strips remain intact and are not punctured, it is likely that if any electrical shorting does occur then it will occur via liquid films coating the surface of the insulator. With this in mind the insulator should also be hydrophobic i.e. maintain a high contact angle with water in order to produce a non-wetting surface and thus to help to isolate droplets of water. Basically if the contact angle is greater than 90° it forms droplets if it is less than 90° it spreads out. So the higher the contact angle the lower the chance of forming a continuous film of water Materials Anode Wires Anode wires of 0.8 mm and 0.65 mm diameter, could be titanium, stainless steel or copper coated with mixed metal oxide (MMO). The MMO should be an iridium-tantalum-based material of the type used for oxygen evolution in cathodic protection applications.

Cathode Wires

Cathode wires should utilise stainless steel or other metallic materials with a similar blend of resistance to corrosion and electrical resistivity.

Electrical Transfer

As described above in the weave design the electrical transfer is achieved via one or more warp transfer strips (WTS). These are in electrical contact with a plurality of electrical brushes including carbon or carbon copper composites. Different voltages can be applied along the length of length of the belts to optimise the electro-osmotic effect and control power consumption. This electrical transfer method provides for the pickup and discharge of current to the moving belts.

Figure 5:
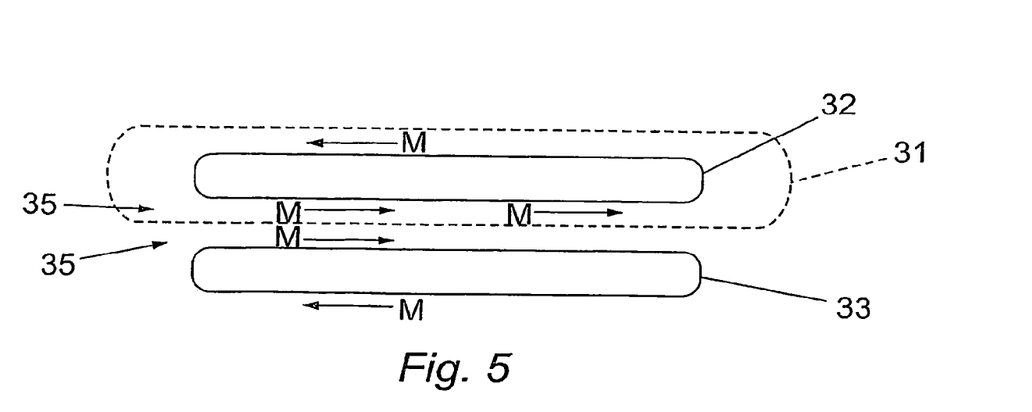
FIG. 5 is a side view of an alternative possible belt press arrangement.

FIG. 5 shows the use of a three belt system. The middle belt 31 is the anode and the upper 32 and lower 33 outside belts are cathodes. Belts are of similar design to the above. In use, sludge or other material is inserted via an inlet 35 between the middle belt and each outer belt. Belts move in direction M. Two electro-osmotic circuits are set up, between the central anode and outer cathodes.

The advantage of this arrangement are:
i. The cathode belts can be formed using less expensive conducting elements.
ii. The middle anode belt can be formed to have a longer life than the cathode belts and would typically be formed using titanium coated with mixed metal oxide.
iii. The volume of sludge, slurry or tailings to be treated can be increased as the movement of water is towards two cathodes, but the voltage gradient is similar to that when only two belts are used.

The invention thus provides an admirable way to modify existing dewatering apparatus which rely solely on hydraulic dewatering or to create new apparatus based in part on and exploiting existing hydraulic dewatering principles so as to exploit the enhanced efficiency available through using electrokinetic effects in a suitably controlled manner.

The invention claimed is:

1. An apparatus for reducing the liquid content of a material comprising a mixture of solid particles and liquid, the apparatus comprising:
   containment means to contain the material, and
   means to apply pressure to the contained material therein;
   the containment means being partly defined by at least one first sheet member comprising a first filtration membrane permeable to the liquid but impermeable to at least some of the solid particles contained within the material, wherein the first filtration membrane comprises a woven textile having at least one conductive element woven into at least a part thereof to form a first electrode; and
   the containment means being further partly defined by at least one second sheet member comprising a second filtration membrane permeable to the liquid but impermeable to at least some of the solid particles contained within the material,
   wherein the second filtration membrane comprises a woven textile having at least one conductive element woven into at least a part thereof to form a second electrode;
   wherein, in use, the first and second electrodes are spaced from each other and in contact with the material to allow application of a potential difference across the material;
   wherein said at least one conductive element of the first and/or second filtration membrane comprises a plurality of conductive weft elements; and
   wherein the first and/or second filtration membrane further comprises at least one conductive warp element, in electrical contact with the conductive weft elements of the respective first/second filtration membrane, but woven in such manner as to be partly exposed on the surface of the respective first/second filtration membrane.

2. An apparatus according to claim 1 wherein the means to apply pressure acts to urge at least one first and at least one second sheet members towards each other, reducing the distance between them so as to apply hydraulic pressure to the material to be dewatered.

3. An apparatus according to claim 1 configured as a belt filter press comprising at least two belts,
   wherein at least one first belt comprises said first filtration membrane and at least one second belt comprises said second filtration membrane.

4. An apparatus according to claim 3 configured such that the containment means defines a conduit with an input for material to be dewatered and an output for dewatered material, the apparatus comprising a means to apply pressure along the conduit, at least one said first belt comprising a first filtration membrane substantially along the length thereof and at least one said second belt spaced apart from said at least one first belt in use to retain material to be dewatered therebetween, and to allow application of a potential difference, in use, across the material to be dewatered within the conduit.

5. An apparatus according to claim 4 wherein the means to apply pressure along the conduit acts to urge the at least two belts towards each other to induce a hydraulic pressure in the material to be dewatered therebetween, and is so arranged that this pressure is increased as the material passes along the conduit.

6. An apparatus according to claim 3 wherein each belt is disposed as a continuous belt around a plurality of pressure rollers and/or guide rollers, each roller being an insulator at least on a contact surface thereof.

7. An apparatus according to claim 3 wherein the edges of each belt are provided with an insulating surface coating to permit the edges of opposing belts to touch without creating a short circuit.

8. An apparatus according to claim 7, wherein the insulating surface coating is hydrophobic.

9. An apparatus according to claim 3 wherein the first and second belts are woven belts, said conductive weft elements are disposed transversely to the respective belt, and wherein the or each conductive warp element is located toward one of both edges of the respective belt and extend longitudinally along the respective belt.

10. An apparatus according to claim 9, further comprising an electrical supply system comprising projecting brushes linked to a power supply and caused to contact at least one said conductive warp element of the first and/or second belt.

11. An apparatus according to claim 1 wherein at least one said first and/or second filtration membrane is a respective woven sheet material having a primarily non-conductive polymeric base structure.

12. An apparatus according to claim 11 wherein the conductive elements are elongate conductive elements comprising thread, tape, or wire.

13. An apparatus according to claim 1, wherein the conductive elements comprised within at least one of the first and/or second filtration membranes comprise metallic elements coated in mixed metal oxide.

14. An apparatus according to claim 1 wherein at least one of the first and/or second filtration membranes comprises polymeric material loaded with carbon.

15. An apparatus according to claim 1, wherein at least one of the first and/or second filtration membranes comprises a plurality of discrete conductive regions.

* * * * *